Jan. 31, 1950     A. G. PARKER     2,495,758
WELDING JIG
Filed June 22, 1948
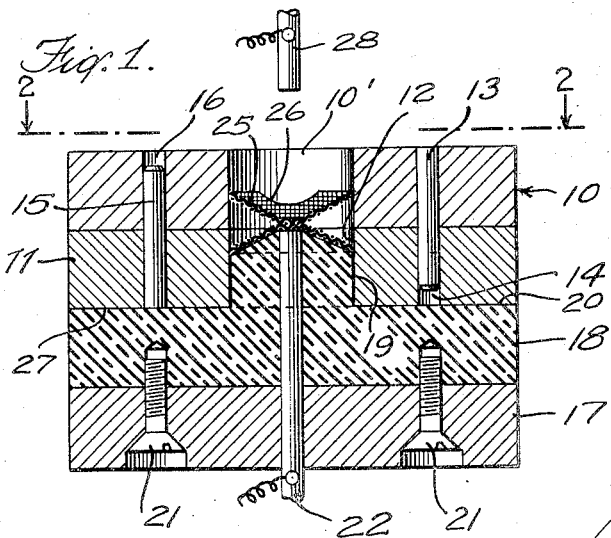
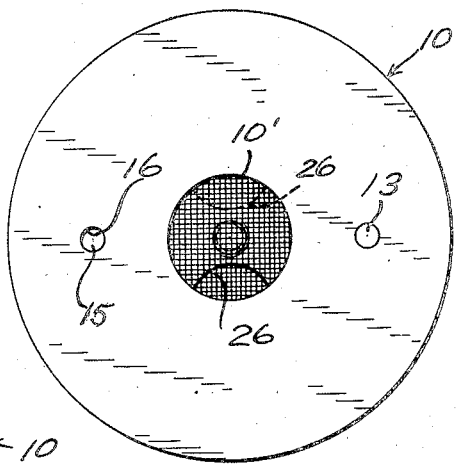
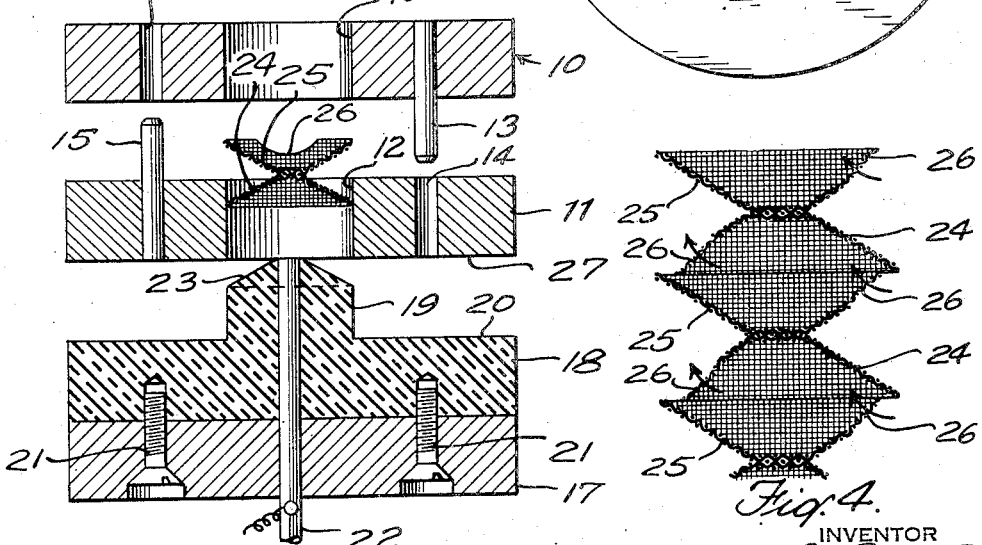
INVENTOR
ALFRED G. PARKER
BY E. Francis Wentworth Jr.
ATTORNEY Patented Jan. 31, 1950

2,495,758

UNITED STATES PATENT OFFICE 2,495,758

WELDING JIG

Alfred G. Parker, Summit, N. J., assignor to Foster Wheeler Corporation, New York, N. Y., a corporation of New York Application June 22, 1948, Serial No. 34,390

10 Claims. (Cl. 219—4)

The present invention relates to jigs and fixtures and more particularly to jigs for the electric resistance welding of articles together.

In welding together packing units or sections of metallic capillary material, such as wire mesh, particularly of the type described in United States patent to D. F. Stedman, No. 2,227,164, granted December 31, 1940, which packing is used in fractionating columns, scrubbers and the like, the wire mesh members, which members are truncated conical-shaped discs, are positioned within a jig having a central cylindrical passage with the apex ends of the members in contact. The apex ends are first welded together, and the attached members are then removed from the jig and placed within another jig, such as disclosed in the United States patent to L. Niissen and S. J. Finelli, No. 2,402,178, granted June 18, 1946, wherein the final welding is performed, namely the welding together of adjacent members at the periphery of their bases.

Normally, in performing the first welding operation, that is, the welding of the apices of adjacent members together, the wire mesh members are positioned within a cylindrical passage of substantially the same diameter as the members by inserting one of the members into one end of the passage with the apex of the member facing in one direction and inserting another member through the opposite end of the passage with the apex thereof facing toward the apex of said one member so that the apices of the two members are adjacent one another. The apices are then brought into contact with one another and the members are welded together at said apices. After welding, the members are removed through one end or the other of the passage. In sliding the welded members in either direction, the peripheral edge of one of the wire mesh members will tend to tightly engage the peripheral wall of the passage and bend said peripheral edge toward the horizontal thereby deforming said member. The other member, however, will slide out easily since the direction of movement will not be against the angle of the sides of the member.

The welding jig of the present invention overcomes the deformation of one of the truncated conical-shaped members after welding by dividing the jig into two separable sections each having a cylindrical passage therethrough which passages are in alignment. The wire mesh members are positioned within the passages with their apices in contact and so that the peripheral edge of the base of one of the mesh members bears against the surface of the passage in one of the jig sections while the peripheral edge of the other wire mesh member bears against the peripheral surface of the passage through the other member.

The invention will be understood from the following description when considered in connection with the accompanying drawing forming a part thereof and in which:

Fig. 1 is a transverse sectional view through the welding jig of the present invention;

Fig. 2 is an elevational view taken on the line 2—2 of Fig. 1;

Fig. 3 is a view similar to Fig. 1 but with the various parts of the jig removed one from the other, and Fig. 4 is a transverse sectional view of the packing members after welding together at the apices in accordance with the present invention, and also after welding at their bases.

Like characters of references refer to like parts throughout the several views.

Referring to the drawing, the welding jig of the present invention comprises a disc-shaped metallic section 10 having a circular passage 10' therethrough in the central portion thereof which passage extends axially of section 10. The jig also has a section 11 similar to section 10 and having a passage 12 similar to passage 10' extending therethrough.

Sections 10 and 11 are adapted to be fitted together so that passages 10' and 12 are in axial alignment with one another and form a continuous passage through the jig. So that the sections 10 and 11 may readily be fitted together, a positioning pin 13 is secured in section 10, which pin extends axially of section 10 and projects beyond one face of said section into an aperture 14 extending axially of section 11 and in alignment with pin 13. Another positioning pin 15 similar to pin 13 is secured to section 11 and projects beyond the face thereof adjacent said one face of section 10 and into aperture 16 projecting axially of section 10 and in alignment with the pin 15. Pins 13 and 15 are secured in the sections 10 and 11, respectively, in diametrically opposite positions and are of such diameter in respect to apertures 14 and 16, respectively, that the pins will slidably engage said apertures.

The jig of the present invention also comprises an end member 17 of substantially the same diameter as the sections 10 and 11, which member is of an electrical conductive material lined on one face thereof by insulation 18 which is of substantially the same diameter as sections 10 and 11. The insulation 18 is also in the form of a disc and has a mandrel 19 extending outwardly from the face 20 thereof. Mandrel 19 is of such diameter that it will slidably engage the peripheral surface of either passage 12 or passage 10'. As shown, the insulation 18 and end member 17 are secured by set screws 21 and an electrode 22 extends axially through the end member 17, insulation 18 and mandrel 19. The mandrel 19 has a truncated conical-shaped end portion 23 which is adapted to engage the inner surface of one member 24 of wire mesh packing.

The wire mesh packing comprises members 24 and 25 (Fig. 4) each of which consists of a comparatively flat truncated conical-shaped disc of wire mesh. The adjacent members 24 and 25 are first welded together at their apices to provide a pair of packing members. Adjacent pairs of packing members are then welded together base to base, as shown in Fig. 4. The mesh of the packing members is such that the liquid being treated will completely seal the openings therein, while larger vapor openings 26, which are not sealed by the liquid, are provided for the passage of gases or vapor under treatment. As used herein, and in the claims, the word "vapor" includes "gases."

The mandrel 19 extends away from the face 20 of insulation 18 such distance that when the sections 10 and 11 are positioned on the end member 17, the mandrel will project into passage 12 to a point where the packing member 24, the inner periphery of which is engaged by section 23 of the mandrel, will be supported thereby so that the periphery of the base of member 24 will engage the peripheral surface of passage 12 and the periphery of the base member 25 will engage the peripheral surface of passage 10' in section 10 when the apices of said members abut one another.

In operation, packing member 24 is positioned on the end 23 of mandrel 19 and the section 11 placed so that mandrel 19 extends into passage 12 and face 27 of section 11 abuts the face 20 of insulation 18. Section 11, end member 17, mandrel 19, and packing member 24 will then be in the position shown in Fig. 1. Section 10 of the jig is then positioned in relation to section 11 so that pin 13 slidably engages aperture 14 in section 11 and pin 15 slidably engages aperture 16 in section 10. A packing member 25 is then positioned in passage 10' with the apex thereof toward the apex of packing member 24 and slid in said passage 10' until the apex of member 25 engages the apex of packing member 24. Members 24 and 25 are also positioned in relationship to one another so that the vapor openings 26 are spaced from each other substantially 180°. Welding element 28 (Fig. 1) is then projected into passage 10' until said welding element engages the apex of member 25. Welding electrode 22, which extends slightly beyond the section 23 of mandrel 19, engages the apex of member 24. Electrical current is supplied to the opposite welding elements 22 and 28 and the packing members 24 and 25 are thereby welded to one another at their apices.

After welding, sections 10 and 11 are moved upwardly and away from the end member 17, as shown in Fig. 3, the packing members 24 and 25 being removed with the sections 11 and 10. Thereafter, sections 10 and 11 of the jig are moved apart until pin 13 disengages aperture 14 and pin 15 disengages aperture 16 (Fig. 3). In moving the sections 10 and 11 apart, it will be noted that the movement of the peripheral surface of passage 10' of section 10 is with the angle of the conical-shaped side of member 25 and not against said angle so that the member 25 will not be deformed at the base thereof by said movement. The length of pins 13 and 15 are such that they do not disengage the apertures 14 and 16 respectively until after the peripheral edge of member 25 has disengaged the passage 10'. Passages 10' and 12 will thereby be maintained in alignment until after the member 25 is free of passage 10' thereby preventing deformation of members 24 and 25 after welding at their apices.

If the packing member 24, which is welded to member 25, has been retained by engagement of the periphery of the base thereof with the peripheral surface of passage 12, as shown in Fig. 3, the members 24 and 25 may be removed by withdrawing them in a direction the same as the direction of the withdrawal of section 10 from section 11. It will be noted that the direction of withdrawal of the packing member 24 from the passage 12, in this instance, will be with the angle of the conical-shaped side of member 24 and not against the angle thereof. The base of the member, therefore, will not be deformed by withdrawal. It should also be noted that after welding, should the peripheral edge of the base of member 25 so tightly engage the peripheral surface of passage 10' in section 10 that the member 24 is removed from passage 12 of section 11, the direction of movement of member 24 will be with the angle of the conical-shaped side of said member. The member 25 may then be removed from passage 10' by withdrawing said member from section 10 in a direction toward section 11. This movement will be with the angle of the conical-shaped side of packing member 25.

Inasmuch as changes may be made in the form, location and relative arrangement of the several parts of the welding jig disclosed without departing from the essential characteristics of the invention, it will be understood that the invention is not to be limited excepting by the scope of the appended claims.

What is claimed is:

1. A jig for the electric resistance welding together of the bodies of two articles each having a body with a peripheral edge, the bodies being of such shape and of such material that they are bendable in a direction away from one another without deformation of said bodies, said jig comprising two separate work holding members so associated that they are movable away from one another in opposite directions, each work holding member having a passage therethrough, the passages of said members being in axial alignment, the relative transverse size of said passages and said articles being such that the peripheral surface of the passages and the peripheral edge of the articles engage one another, and positioning means adapted to position one of the articles within the passage of one of the work holding members with the peripheral edge of said one article in engagement with the peripheral surface of the passage of said one member and position the other article so that the peripheral edge thereof is in engagement with the peripheral surface of the passage in said other member when the bodies of the articles abut one another.

2. A jig for the electric resistance welding together of the bodies of two articles each having a body with a peripheral edge, the bodies being of such shape and of such material that they are bendable in a direction away from one another without deformation of said bodies, said jig comprising two separate work holding members, each work holding member having a passage therethrough, the relative transverse size of said passages and said articles being such that the peripheral surface of the passages and the peripheral edge of the articles engage one another, means for positioning the work holding members closely adjacent one another and so that the passages therethrough are in axial alignment, and a mandrel adapted to position one of the articles within the passage of one of the work holding members with the peripheral edge of said one article in engagement with the peripheral surface of the passage of said one member and position the other article so that the peripheral edge thereof is in engagement with the peripheral surface of the passage in said other member when the bodies of the articles abut one another.

3. A jig for the electric resistance welding together of the bodies of two articles each having a body with a peripheral edge, the bodies being of such shape and of such material that they are bendable in a direction away from one another without deformation of said bodies, said jig comprising two separate work holding members so associated that they are movable away from one another in opposite directions, each work holding member having a passage therethrough, the passages of said members being in axial alignment, the relative transverse size of said passages and said articles being such that the peripheral surface of the passages and the peripheral edge of the articles engage one another, a mandrel of non-electrical conductive material adapted to engage one of the articles and position said article within the passage of one of the work holding members with the peripheral edge of said one article in engagement with the peripheral surface of the passage of said one member and position the other article so that the peripheral edge thereof is in engagement with the peripheral surface of the passage in said other member when the bodies of the articles abut one another, and a contact in communication with one side of a welding circuit, the contact being disposed in said mandrel and extending into engagement at the place of welding with the body of the article engaged by the mandrel.

4. A jig for the electric resistance welding together of the bodies of two articles each having a body with a circular peripheral edge, the bodies being of such shape and of such material that they are bendable in a direction away from one another without deformation of said bodies, said jig comprising two separate disc-shaped work holding members so associated that they are movable away from one another in opposite directions, each work holding member having a cylindrically-shaped passage therethrough, the passages of said members being in axial alignment, the relative diameter of said passages and said articles being such that the peripheral surface of the passages and the peripheral edge of the articles engage one another, a mandrel of non-electrical conductive material adapted to engage one of the articles and position said article within the passage of one of the work holding members with the peripheral edge of said one article in engagement with the peripheral surface of the passage of said one member and position the other article so that the peripheral edge thereof is in engagement with the peripheral surface of the passage in said other member when the bodies of the articles abut one another, and a contact in communication with one side of a welding circuit, the contact being disposed in said mandrel and extending into engagement at the place of welding with the body of one of the articles engaged by the mandrel.

5. A jig for the electric resistance welding together at the apices thereof, two substantially conically-shaped articles of a bendable metallic material, said jig comprising two separate work holding members so associated that they are movable away from one another in opposite directions, each work holding member having a cylindrically-shaped passage therethrough, the passages of said members being in axial alignment, the relative diameter of said passages and the base of said articles being such that the peripheral surface of the passages and the peripheral edge of the base of the articles engage one another, and a mandrel of non-electrical conductive material adapted to engage one of the articles when the articles are positioned within the work holding members with the apices of said articles abutting one another and position said article within the passage of one of the work holding members with the peripheral edge of the base of said one article in engagement with the peripheral surface of the passage of said one member and position the other article so that the peripheral edge of the base thereof is in engagement with the peripheral surface of the passage in said other member.

6. A jig for the electric resistance welding together at the apices thereof, two substantially conically shaped vapor and liquid contact articles of metallic capillary material, said jig comprising two separate work holding members so associated that they are movable away from one another in opposite directions, each work holding member having a cylindrically-shaped passage therethrough, the passages of said members being in axial alignment, the relative diameter of said passages and the base of said articles being such that the peripheral surface of the passages and the peripheral edge of the base of the articles engage one another, and a mandrel of non-electrical conductive material adapted to engage one of the articles when the articles are positioned within the work holding members with the apices of said articles abutting one another and position said article within the passage of one of the work holding members with the peripheral edge of the base of said one article in engagement with the peripheral surface of the passage of said one member and position the other article so that the peripheral edge of the base thereof is in engagement with the peripheral surface of the passage in said other member.

7. A jig for the electric resistance welding together at the apices thereof, two substantially frusto-conical-shaped vapor and liquid contact articles of wire mesh material, said jig comprising two separate work holding members so arranged that they are movable away from one another in opposite directions, each work holding member having a cylindrically-shaped passage therethrough, the passages of said members being in axial alignment, the relative diameter of said passages and the base of said articles being such that the peripheral surface of the passages and the peripheral edge of the base of the articles engage one another, and a mandrel of non-electrical conductive material adapted to engage one of the articles when the articles are positioned within the work holding members with the apices of said articles abutting one another and position said article within the passage of one of the work holding members with the peripheral edge of the base of said one article in engagement with the peripheral surface of the passage of said one member and position the other article so that the peripheral edge of the base thereof is in engagement with the peripheral surface of the passage in said other member.

8. A jig for the electric resistance welding together at the apices thereof, two substantially frusto-conical-shaped vapor and liquid contact articles of wire mesh material, said jig comprising two separate work holding members, each work holding member having a cylindrically-shaped passage therethrough, the relative diameter of said passages and the base of said articles being such that the peripheral surface of the passages and the peripheral edge of the articles engage one another, means for positioning the work holding members in abutting relationship with one another and so that the passages therethrough are in axial alignment, and a mandrel of non-electrical conductive material adapted to engage one of the articles and position said article within the passage of one of the work holding members with the peripheral edge of the base of said one article in engagement with the peripheral surface of the passage of said one member and position the other article so that the peripheral edge of the base thereof is in engagement with the peripheral surface of the passage in said other member when the apices of the articles abut one another.

9. A jig for the electric resistance welding together of liquid and vapor contact devices of capillary material, said devices comprising a plurality of cells, each cell having two elements of capillary material of substantially frusto-conical configuration disposed base to base with the apices of adjacent cells in abutting relationship, said jig comprising work holding members so associated that they are movable away from one another in opposite directions, each work holding member having a cylindrically-shaped passage therethrough, the passages of said members being in axial alignment, the relative diameter of said passages and said elements being such that the peripheral surface of the passages and the peripheral edge of the base of the elements engage one another, a mandrel of non-electrical conductive material adapted to engage one of the elements and position said element within the passage of one of the work holding members with the peripheral edge of the base of said one element in engagement with the peripheral surface of the passage of said one member and position the other element so that the peripheral edge of the base thereof is in engagement with the peripheral surface of the passage in said other member when the apices of the elements of adjacent cells abut one another, a contact in communication with one side of a welding circuit, the contact being disposed in said mandrel and extending into engagement with the apex of the element engaged by the mandrel.

10. A jig for the electric resistance welding together of liquid and vapor contact devices of capillary material, said devices comprising a plurality of cells, each cell having two elements of capillary material of substantially frusto-conical configuration disposed base to base with the apices of adjacent cells in abutting relationship, said jig comprising two separate disc-shaped work holding members so associated that they are movable away from one another in opposite directions, each work holding member having a cylindrically-shaped passage therethrough, the passages of said members being in axial alignment, the relative diameter of said passages and said elements being such that the peripheral surface of the passages and the peripheral edge of the base of the elements engage one another, a mandrel of non-electrical conductive material extending into the passage of one of the members to engage and position said element within the passage of said one member with the peripheral edge of the base of the element in engagement with the peripheral surface of the passage of said one member and position the other element so that the peripheral edge of the base thereof is in engagement with the peripheral surface of the passage in said other member when the apices of the elements of adjacent cells abut one another, said mandrel having a disc-shaped base member of non-electrical conducting material abutting said one work holding member, and an electrical contact positioned in and extending through said mandrel and into contact with the apex of the member engaged thereby.

ALFRED G. PARKER.

REFERENCES CITED

The following references are of record in the file of this patent:

UNITED STATES PATENTS

| Number | Name | Date |
| --- | --- | --- |
| 1,445,231 | Muller | Feb. 13, 1923 |
| 1,978,363 | Fuchs et al. | Oct. 23, 1934 |
| 2,158,229 | Goldthwaite | May 16, 1939 |